United States Patent
Mawhinney et al.

(10) Patent No.: US 6,493,352 B1
(45) Date of Patent: Dec. 10, 2002

(54) AUTOMATIC CONFIGURATION SYSTEM WHICH ANALYZES HDLC FLAG DATA IN TDM TIME SLOTS FOR DETERMINING WHICH TIME SLOT(S) IS DEDICATED FOR FRAME RELAY SERVICE

(75) Inventors: Ted Nodine Mawhinney, Clearwater; Luis Benjamin Roa, Safety Harbor, both of FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/116,169

(22) Filed: Jul. 16, 1998

Related U.S. Application Data
(60) Provisional application No. 60/085,682, filed on May 15, 1998.

(51) Int. Cl.[7] .................... H04L 12/43; H04L 12/66; H04J 3/00
(52) U.S. Cl. ................ 370/458; 370/463; 370/498; 370/537
(58) Field of Search ................ 370/255, 229, 370/311, 328, 314, 335, 352, 353, 364, 392, 395, 397, 402, 422, 458, 462–463, 465, 474, 498, 532, 535, 537, 540; 455/442, 561; 359/137; 709/100, 212, 234, 235, 249; 710/31, 48, 123; 725/50

(56) References Cited

U.S. PATENT DOCUMENTS

| | | | | |
|---|---|---|---|---|
| 5,459,723 A | * | 10/1995 | Thor | 370/392 |
| 5,802,042 A | * | 9/1998 | Natarajan et al. | 370/255 |
| 5,859,835 A | * | 1/1999 | Varma et al. | 370/229 |
| 5,963,541 A | * | 10/1999 | Koga et al. | 370/229 |
| 5,974,554 A | * | 10/1999 | Oh | 713/300 |
| 5,991,279 A | * | 11/1999 | Haugh et al. | 370/311 |
| 6,108,350 A | * | 8/2000 | Araujo et al. | 370/467 |

* cited by examiner

*Primary Examiner*—David R. Vincent
(74) *Attorney, Agent, or Firm*—Thomas, Kayden, Horstemeyer & Risley, LLP

(57) ABSTRACT

Disclosed is an automatic configuration system and method for automatically configuring the time slots on a time division multiplexing connection line that is dedicated for frame relay service. Generally, the system and method described involve the determination of potential dedicated time slots configured at the central office for frame relay traffic. Next, a level of confidence is determined regarding the potential dedicated time slots. If the level of confidence is high, then the system attempts to establish a local management interface with the central office frame relay switch, service, or similar device over the potential dedicated time slots. Once the local management interface is established using the potential dedicated time slots, then these time slots are stored as the new configuration for frame relay traffic by the frame relay DSU.

19 Claims, 3 Drawing Sheets

AUTOMATIC CONFIGURATION SYSTEM WHICH ANALYZES HDLC FLAG DATA IN TDM TIME SLOTS FOR DETERMINING WHICH TIME SLOT(S) IS DEDICATED FOR FRAME RELAY SERVICE

CROSS REFERENCE TO RELATED APPLICATIONS

This application claims the benefit of co-pending United States provisional patent application entitled "Method for Automatic Discovery and Configuration of T1 Timeslots and LMI in a Frame Relay Network" filed on May 15, 1998 and given Ser. No. 60/085,682. The foregoing provisional application is incorporated herein by reference.

FIELD OF THE INVENTION

This invention relates to the field of data communication using a frame relay network, and more particularly, to an automatic configuration system and method for configuring time slots dedicated to data communication over a frame relay network. Although not limited to this particular application, the automatic configuration system and method are particularly suited for implementation in a digital service unit (DSU).

BACKGROUND OF THE INVENTION

Modern communications networks often include a number of paths or links that are interconnected to route information such as voice, video, or data traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user. This type of network is conventionally referred to as a "circuit-switching network." Accordingly, a source node of one office at one location of the network may transmit data to a destination node of a second office located at another location of the network through their respective switching facilities.

At any given location, a large number of source nodes may desire to communicate through their respective switching facilities, or interconnect node, to destination nodes at various other locations of the network. The data traffic from the various source nodes is first multiplexed through the source switching facility, then demultiplexed at the destination switching facility and finally delivered to the proper destination node. A variety of techniques for efficiently multiplexing data from multiple source nodes onto a single circuit of the network are presently employed in private line networks. For instance, time division multiplexing ("TDM") affords each source node full access to the allotted bandwidth of the circuit for a small amount of time. The circuit is divided into defined time segments, with each segment corresponding to a specific source node, to provide for the transfer of data from those source nodes, when called upon, through the network.

Frame-relay networks, on the other hand, are often referred to as "packet-switching networks." Packet-switching networks, as opposed to circuit-switching networks, allow multiple users to share data network facilities and bandwidth rather than providing a specific amount of dedicated bandwidth to each user, as in TDM. Instead, packet switches divide bandwidth into connectionless, virtual circuits. As is known, virtual circuit bandwidth is consumed only when data is actually transmitted. Otherwise, the bandwidth is not used. In this way, packet-switching networks essentially mirror the operation of a statistical multiplexer (whereby multiple logical users share a single network access circuit).

It is often the case that a time division multiplexing (TDM) connection line is employed to interface between a source node and an interconnect node in a frame relay network. This may be accomplished by establishing a TDM connection between the customer premises and the frame relay network, such as a T1 line, which is known to those skilled in the art, having a number of time slots for both data and voice communications. Of the time slots that are available, one or more may be dedicated to frame relay traffic by the service provider. Thus the end user is required to configure their frame relay equipment to communicate using these dedicated time slots.

Configuration of a frame relay device which interfaces with a frame relay network using a TDM connection line is a manual process that can be a tedious and error prone task. Generally, in such situations, the user or the service provider configures the exact time slots on the TDM connection line that have been dedicated to carry frame relay traffic to the frame relay device. To do so, the user or service provider needs to know the time slots which have been so dedicated. Also, the user or service provider needs to identify the local management interface used by the frame relay components in this network.

The performance of these tasks can be costly. For instance, the seller of the frame relay digital service units (DSU's) to the end user may be required to visit the customer premises to configure the network at start-up. A DSU is generally a unit which provides data terminal equipment with access to a local loop. Also, in the case where a TDM connection line is already employed, it is possible that additional time slots may be added by the service provider, requiring a reconfiguration of the time slots employed for frame relay traffic resulting in further visits. In the case where customers employ many DSU's in their organization, the cost of configuration of these networks may be significant.

Consequently, there is a need for a system and method for configuring a frame relay network in an economic and efficient manner to reduce the cost and inconvenience of installing and updating frame relay service to an end user.

SUMMARY OF THE INVENTION

The present invention provides an automatic configuration system and method for automatically configuring a frame relay network by the automated determination of the time slots on a TDM connection line and the automated determination of the type of local management interface employed by the frame relay device employed by the service provider.

According to the automatic configuration system of the preferred embodiment of the present invention, a frame relay DSU employs a processor which operates pursuant to operating logic stored on a memory. The operating logic includes logic which automatically determines the time slots that are dedicated for frame relay service. In accomplishing this task, this logic samples the TDM line and detects high-level data link control (HDLC) flags transmitted by the frame relay device on any of the time slots. Next, the logic sets a level of confidence that corresponds to the probability that the HDLC flags detected were generated by the service provider's frame relay device rather than being a random value. The logic then either increases or decreases the level of confidence based upon subsequent re-sampling of the TDM line which reveals changes or a lack of change in the HDLC flags detected previously on the various time slots. Once the level of confidence is sufficiently high, the time slots with the HDLC flags are deemed to have been dedicated for frame relay traffic. At this point, the logic attempts to establish a local management interface (LMI) with the service provider's frame relay device using the dedicated time slots detected. The logic further examines multiple HDLC flags which emanate from different frame relay devices which communicate via the same TDM line, establishing specific LMI's for each frame relay device.

The present invention may also be viewed as providing a method for automatically configuring a frame relay network by performing the steps in which the time slots dedicated for frame relay traffic are determined automatically. This method includes the steps of sampling the TDM line and detecting a high-level data link control (HDLC) flag on any time slot. Next, the step is executed of setting a level of confidence that corresponds to the probability that the HDLC flags detected were generated by a frame relay device from the service provider rather than being a random value. Thereafter, the steps of increasing or decreasing the level of confidence based on changes or a lack of change of the HDLC flags previously detected by subsequent re-sampling of the TDM line. Finally, once the level of confidence is sufficiently high, the time slots having the HDLC flags are assumed to be dedicated for frame relay traffic. The present method then executes the step of establishing the local management interface with the service provider's frame relay device using the dedicated time slots. The logic further includes the step of examining the TDM line for multiple HDLC flags which emanate from different frame relay devices which communicate via the same TDM line.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
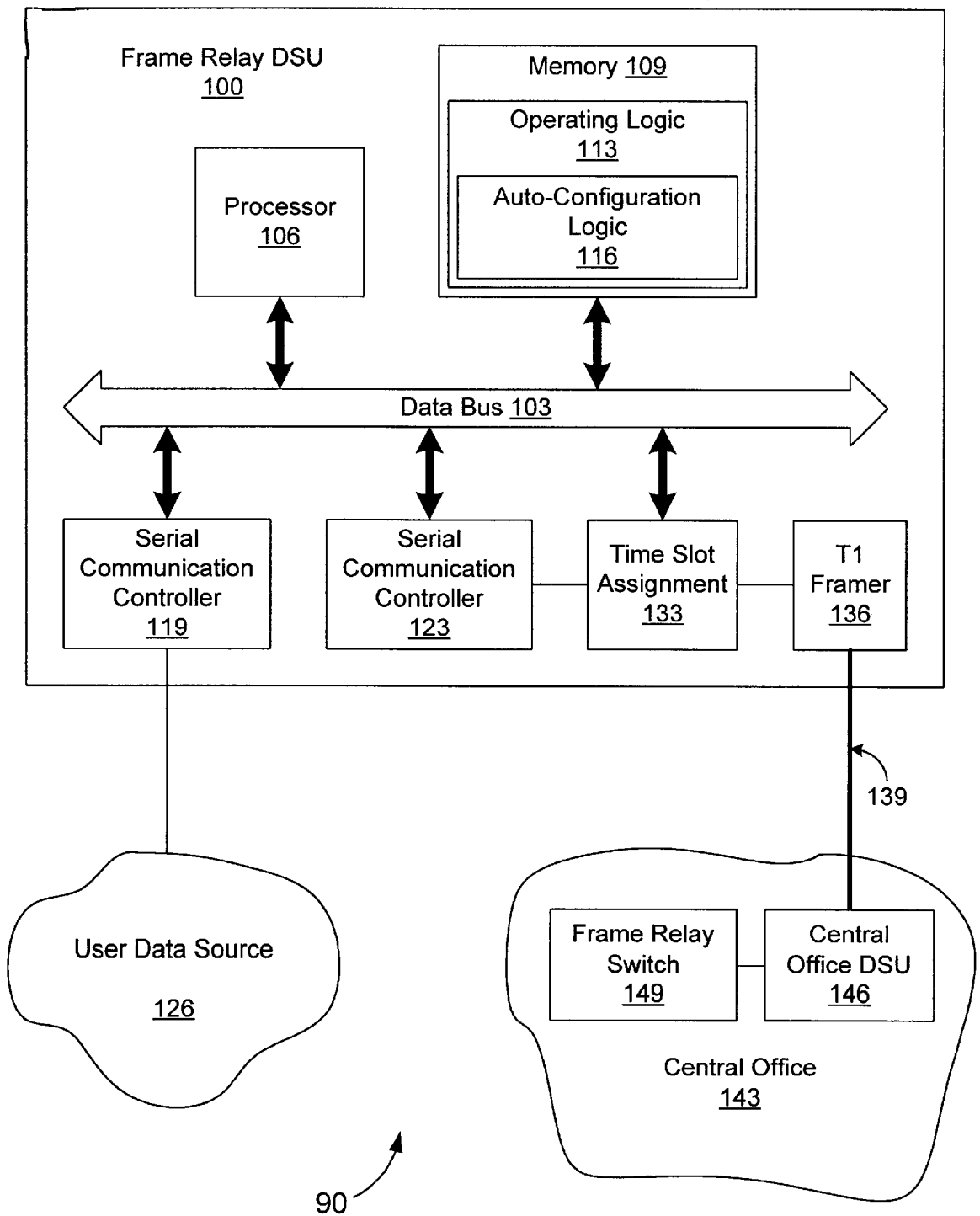
FIG. 1 is a block diagram of a frame relay network employing the automatic configuration system and method according to the preferred embodiment of the present invention.

Turning to FIG. 1, shown is a block diagram of an automatic configuration system 90 according to the preferred embodiment. The automatic configuration system 90 includes a frame relay digital service unit (DSU) 100. The frame relay DSU 100 includes a data bus 103 which is electrically coupled to a processor 106 and a memory 109. Stored on the memory 109 is operating logic 113 in the form of a computer program. Included in the operating logic 113 is auto-configuration (AC) logic 116. Also coupled to the data bus 103 is a first serial communication controller (SCC) 119 and a second SCC 123.

Note that the operating logic 113 may be implemented in software executed by the processor 106, or it may be implemented in hardware as a permanent semiconductor or a combination of software and hardware as known by those skilled in the art. In the case of software implementation, the operation logic 113 may be stored on magnetic tape, magnetic disks, compact disks (CD's) and the like. In hardware implementations, the operating logic 113 may be employed using a permanent memory such as a read only memory (ROM) or flash memory as known by those skilled in the art. In addition, the operating logic 113 may be implemented using a dedicated digital circuit, such digital circuits being known by those skilled in the art and not discussed here in detail.

The first SCC 119 is electrically coupled to a user data source 126. The user data source 126 could be any one of a number of data communication components including a router, data terminal equipment (DTE's), terminal controllers (TC's), front end processors (FEP's), and other data communication equipment that contains a frame relay interface.

The second SCC 123 is also coupled to a time slot assignment device 133, which in turn is electrically coupled to a T1 framer 136. The time slot assignment device 133 is also electrically coupled to the data bus 103. The T1 framer 136 provides an interface with a TDM connection line 139, which is connected to a central office (CO) 143. Located in the central office 143 and electrically coupled to the TDM connection line 139 is a central office DSU 146 or other similar device which communicates with the frame relay DSU 100. A frame relay switch 149 or other similar device is coupled to and in electrical communication with the central office DSU 146. The frame relay switch 149 is electrically coupled to the digital network (not shown) through which the data that originates from the user data source 126 is communicated to a final destination and vice versa, as known by those skilled in the art.

To describe the general operation of the automatic configuration system 90 above, first the user data source 126 generates data to be communicated via the frame relay DSU 100 to the final data destination. The user data is received by the SCC 119. A processor 106 reads the data from the SCC 119 and, pursuant to the operating logic 113, the processor 106 provides the user data to the second SCC 123. The second SCC in turn communicates the user data to the time slot assignment device 133 which assigns the data to specific time slots for communication across the TDM connection line 139. The time slot assignment device 133 also performs the reverse function of reassembling a serial data stream received from the T1 framer 136.

The time slots to which the user data is assigned are communicated to the time slot assignment device 133 via the electrical coupling between the data bus 103 and the time slot assignment device 133 when the automatic configuration system 90 is configured as discussed herein. The user data is then transmitted to the T1 framer 136 which transmits the user data to the central office DSU 146 using time slots of the TDM connection line 139 which are dedicated for frame relay traffic. The central office DSU 146 in turn communicates the user data to the frame relay switch 149 which in turn is connected to the digital network that sends the user data to its ultimate destination. It is understood that data that originates at this ultimate destination follows the reverse path as described above enroute to the user data source 126.

As discussed previously, upon initial start-up, the frame relay DSU 100 should be configured in order to properly communicate with the central office DSU 146 and the frame relay switch 149 located at the central office 143. Specifically, at start-up, the frame relay DSU 100 does not know the precise time slots in the TDM connection line 139 that are dedicated to communicate frame relay traffic, nor does the frame relay DSU 100 know the local management interface used by the frame relay switch 149 located in the central office 143. It is known, however, that the frame relay switch 149 at the central office 143 transmits a serial stream of repeated high-level data link control (HDLC) flags to the frame relay DSU 100 over the time slots of the TDM connection line 139 that have been dedicated for frame relay traffic when a local management interface is not instituted between the frame relay DSU 100 and the frame relay switch 149. The local management interface is necessary to establish data communication between the frame relay switch 149 and the frame relay DSU 100. The local management interface is a link layer communication protocol which provides "keep alive" messages, status information for all data link connection identifiers on the frame relay switch 149, and other information between the frame relay DSU 100 and the frame relay switch 149. Knowing that a serial stream of HDLC flags are transmitted on all time slots dedicated for frame relay traffic on the TDM connection line 139 when the local management interface is not instituted, the automatic configuration system according to the present invention identifies the dedicated time slots by searching for the HDLC flags according to the auto-configuration (AC) logic 116, which is specifically described in the following discussion.

Figure 2:
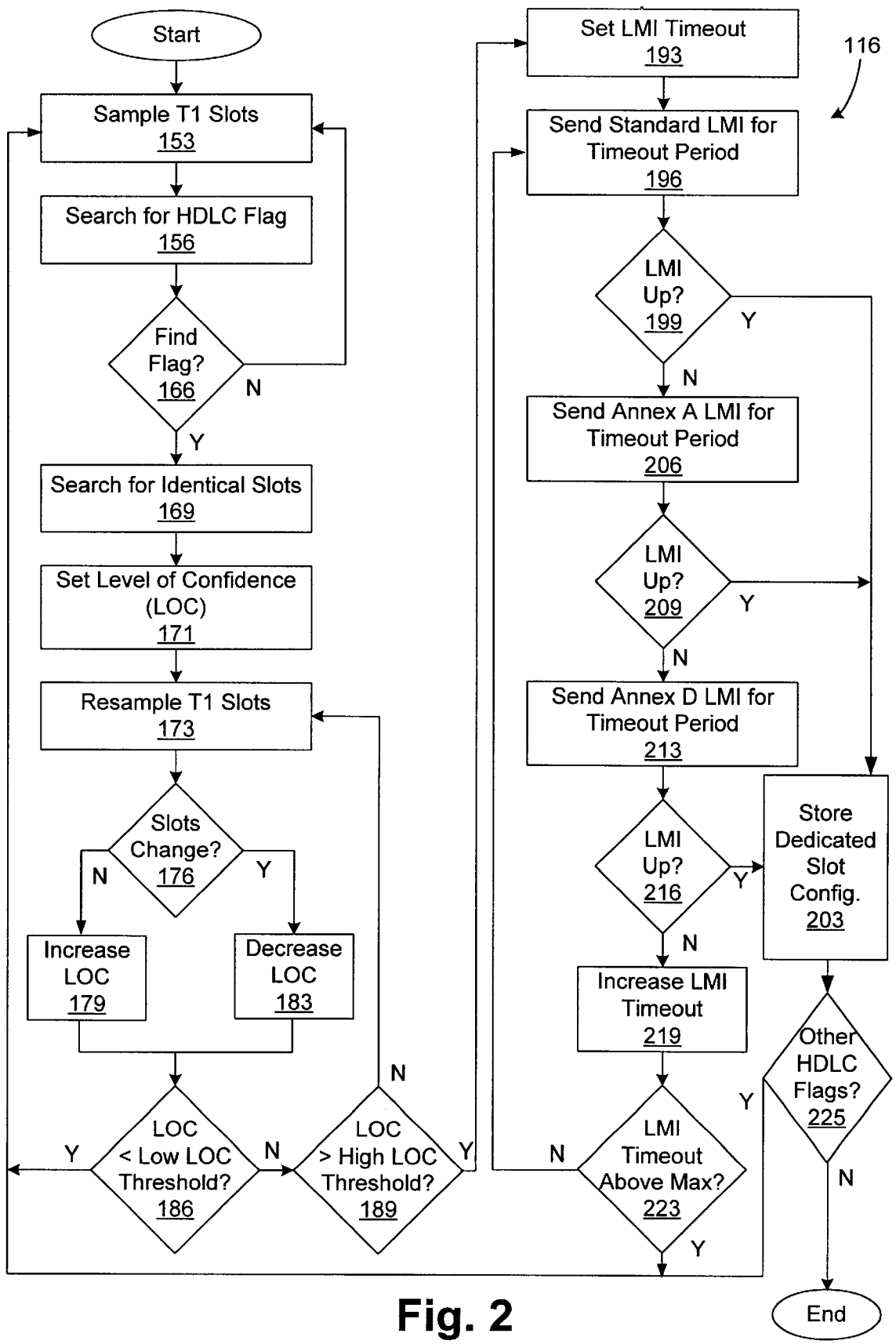
FIG. 2 is a flow chart of the auto-configuration logic of FIG. 1.

Referring now, to FIG. 2, shown is a flow chart of the AC logic 116 (FIG. 1). The flow chart shows the architecture, functionality, and operation of the AC logic 116. In the preferred embodiment, the AC logic 116 is software that is executed by the processor 106. According to the AC logic 116, in block 153, the processor 106 (FIG. 1) takes a single sample of the time slots of the signal on the TDM connection line 139 (FIG. 1). Next, in block 156, the AC logic 116 causes the processor 106 to search the sampled time slots for an HDLC flag which is the eight bit sequence "01111110". The HDLC flag is used according to International Telecommunications Union (ITU) standard ITU Q.922 which is the Integrated Services Digital Network (ISDN) data link layer specification for frame mode bearer services dated February 1992. Recall that the frame relay switch 149 (FIG. 1) transmits a serial stream of repeated HDLC flags when the local management interface is not established. The HDLC flags transmitted are not necessarily synchronized so that each dedicated time slot holds a single HDLC flag. Rather, the HDLC flags may appear in the dedicated time slots to be any one of eight different sequences.

Figure 3:
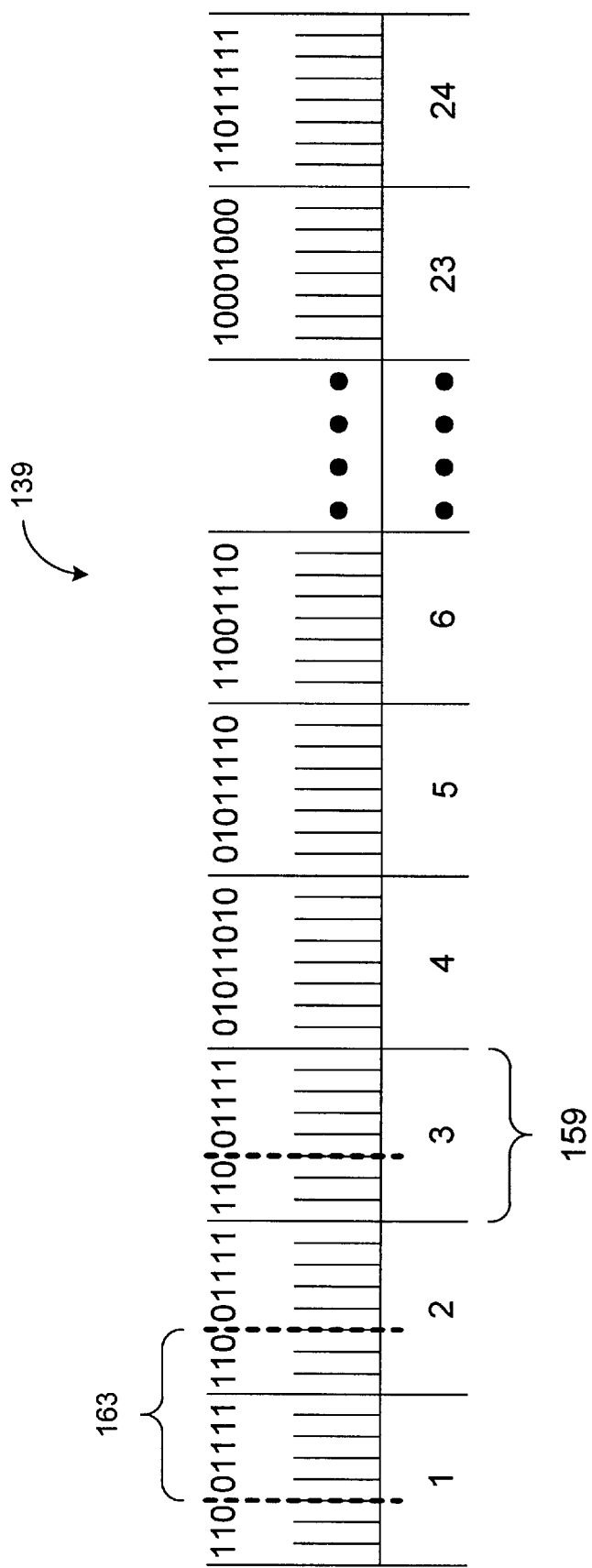
FIG. 3 is a diagram illustrating the time slots of the TDM connection line of FIG. 1.

To explain further, the following discussion refers to FIG. 3, which shows the time slots 159 on a TDM connection line 139. In this example, each time slot 159 is numbered from one to twenty-four as shown, although it is understood that a TDM connection line 139 is not limited to twenty-four time slots. Note that time slots one through three are dedicated to frame relay traffic as an example. Thus, time slots one through three communicate the serial stream of repeated HDLC flags 163. Note also, for example, that the individual HDLC flags 163 do not line up with the time slots 159, but are shifted or offset by three bits. This means that each time slot 159 that is dedicated for frame relay traffic will communicate "11001111" when the local management interface is not established as shown.

In the case of the present invention, this means that when the local management interface has not been established, the time slots 159 which have been dedicated for frame relay traffic will have one of eight sequences, particularly 01111110, 00111111, 10011111, 11001111, 11100111, 11110011, 11111001, or 11111100.

Turning back to FIG. 2, in block 156 the search for an HDLC flag involves a comparison between the sequence in a particular time slot 159 (FIG. 3) examined and each of the above eight sequences. If in block 166, a time slot 159 which contains one of the eight sequences is found, then the AC logic 116 progresses to block 169. If this is not the case, the AC logic 116 reverts to block 153 where another signal sample is taken from the TDM connection line 139.

In block 169, the AC logic 116 searches for any time slots 159 with a sequence which is identical to the sequence found in the time slot 159 in block 166. The time slots 159 which hold this same sequence are thus potentially used to communicate the HDLC flag from the frame relay switch 149 (FIG. 1). For purposes of this discussion, these particular time slots 159 are termed "potential dedicated time slots". Likewise, the common sequence held by all of the potential dedicated time slots is termed the "potential HDLC sequence". It is assumed for purposes of the following discussion, that a single frame relay switch 149 is in communication with the frame relay DSU 100. Instances of multiple frame relay devices in communication over the same TDM connection line are discussed in later text.

The next task is to make sure that the potential dedicated time slots are in fact communicating the serial stream of repeated HDLC flags and are not a random manifestation of the potential HDLC sequence communicated from some other source. To do this, the AC logic progresses to block 171 where a level of confidence variable (LOC) is set at an initial value that falls at the bottom of a level of confidence window. The LOC is a predetermined value which, in the preferred embodiment is one. However it is understood that other values may be used for the initial value. The level of confidence window has a predetermined high LOC threshold and a predetermined low LOC threshold. The functions of the high and low LOC thresholds will be discussed in later text.

Once the LOC has been set at its initial value, the AC logic 116 progresses to block 173 where a new signal sample is taken from the TDM connection line 139 (FIG. 1). Next, in block 176, if the potential HDLC sequence remains in each of the potential dedicated time slots in the new signal sample, then the AC logic 116 progresses to step 179 in which the LOC is increased by a predetermined amount. If, on the other hand, the sequence held by any single potential dedicated time slot in the new signal sample differs from the potential HDLC sequence, then the AC logic 116 progresses to step 183 in which the LOC is decreased by a predetermined amount. In the preferred embodiment, the predetermined amount by which the LOC is increased or decreased is by an increment of 1, where the LOC is an integer.

After either increasing or decreasing the LOC in respective blocks 179 or 183, the AC logic 116 progresses to block 186 where the LOC is compared with the low LOC threshold. If the LOC is below the low LOC threshold, the AC logic 116 reverts back to block 153 where a new signal sample is taken from the TDM connection line 139 and the whole process is started once again. If the LOC is greater than or equal to the low LOC threshold, then the AC logic 116 progresses to block 189.

In block 189, the LOC is compared with the high LOC threshold. If the LOC is greater than the high LOC threshold, then the AC logic 116 progresses to block 193. If the LOC is less than or equal to the high LOC threshold, then the AC logic reverts back to block 173 where the signal on the TDM connection line 139 is resampled.

Thus, in blocks 186 and 189, the LOC is examined to determine if it is within the level of confidence window. If the LOC is within the level of confidence window, then the TDM connection line 139 is resampled and the LOC is increased or decreased accordingly. Thus, in the case where the potential dedicated time slots are in fact those time slots allotted by the central office DSU 146 (FIG. 1) to communicate frame relay traffic, then the LOC will continually increase until it breaches the high LOC threshold. In such a case, a high degree of confidence exists that the potential dedicated time slots are in fact time slots allotted to communicate frame relay traffic. This is because chances are great that the sequences held by these potential dedicated time slots were part of the serial stream of HDLC flags repeatedly transmitted by the frame relay switch 149.

If, on the other hand, the potential dedicated time slots are not those actually allotted by the central office DSU 146 to communicate frame relay traffic, the LOC will continually decrease when multiple changes occur in the sequences held by the potential dedicated time slots until the LOC breaches the low LOC threshold. In such a case, a low degree of confidence exists that the potential dedicated time slots are in fact time slots allotted to communicate frame relay traffic. Rather, chances are that the sequences held by these potential dedicated time slots were random occurrences of the potential HDLC sequence generated from a data source other than the frame relay switch 149. In these situations, new potential dedicated time slots which actually transmit the serial stream of HDLC flags from the frame relay switch 149 should be identified.

Thus, the low LOC threshold and the high LOC threshold should be determined with the foregoing discussion in mind. In particular, the low LOC threshold should be chosen so that potential dedicated time slots which do not retain the potential HDLC sequence are eliminated from scrutiny quickly. In addition, the high LOC threshold should be chosen so that any potential dedicated time slots which retain the potential HDLC sequence are given adequate opportunity to change should they contain a potential HDLC sequence that is generated at random by a data source other than the frame relay switch 149.

If, in block 189, the LOC is above the high LOC threshold, then the AC logic 116 progresses to block 193 where the system sets a local management interface (LMI) time-out. The LMI time-out is a period of time in which the frame relay DSU 100 (FIG. 1) attempts to establish the LMI with the frame relay switch 149 or similar device. There are three different LMI types which are currently in use. However, it is understood that more LMI types may be created and added herein. These three LMI types are a standard LMI which is a defacto standard commonly employed by those skilled in the art, an Annex A LMI which is specified in ITU Q.933 Annex A, October 1995, and an Annex D LMI which are specified in the American National Standards Institute (ANSI) T1.617 Annex D, 1991. ITU Q.933 is entitled "ISDN Signaling Specification for Frame Mode Bearer Services" and Annex A is entitled "Additional Procedures for Permanent Virtual Connection (PVC)". ANSI T1.617 is entitled "Signaling Specifications for Frame Relay Bearer Service" and Annex D is entitled "Additional Procedures for Permanent Virtual Connections (PVC's)".

Moving to block 196, the AC logic 116 causes the frame relay DSU 100 to send a standard LMI request repeatedly for the LMI time-out. Note that the request is communicated to the frame relay switch 149 or other device using the potential dedicated time slots determined in the previous blocks 153–189. If one of the potential dedicated time slots is not in fact one of the time slots dedicated for frame relay traffic by the central office DSU 146, then the LMI cannot be established.

Next, in block 199, if during the LMI time-out period, the LMI is established, then the AC logic 116 progresses to block 203. If, in block 199, the LMI is not established, the AC logic 116 moves to block 206 where an Annex A LMI request is repeatedly transmitted to the frame relay switch 149 for the LMI time-out period. If the LMI is established within the LMI time-out period in block 209, then the AC logic 116 progresses to block 203. If not, then the AC logic 116 moves to block 213 where an Annex D LMI request is repeatedly transmitted to the frame relay switch 149 for the time-out period. If, in block 216, the LMI is established within the LMI time-out period, then the AC logic 116 progresses to block 203. If not, then the AC logic 116 continues to block 219 where the LMI time-out period is increased for another attempt at establishing the LMI.

The AC logic 116 then progresses to block 223 in which the current LMI time-out period is compared with a predetermined LMI time-out maximum threshold value. If the LMI time-out period is above the LMI time-out maximum value, then the AC logic 116 reverts back to block 153 to start the entire process over again. A re-commencement of the process may mean that one of the potential dedicated time slots was not in fact dedicated for frame relay traffic by the central office DSU 146, and, no matter how long the frame relay DSU 100 attempted to establish the LMI with the frame relay switch 149 (i.e. no matter how long the LMI time-out was), it could not be done since the LMI request was sent using an erroneous time slot. There may be other reasons why the LMI was not established relating to faulty communication by the frame relay switch 149 or other disturbance as well.

If, in block 223, the LMI time-out is not above the LMI time-out maximum value, then the AC logic 116 reverts back to block 196 where the attempts to establish the LMI are performed again in blocks 196–216 with a longer LMI time-out period.

If the LMI is established in blocks 199, 209, or 216, then the AC logic 116 moves to block 203. The fact that the LMI was established using one of the LMI types means that the potential dedicated time slots were in fact those allotted by the central office DSU 146 for frame relay traffic. Thus, establishing the LMI confirms the high level of confidence in the potential dedicated time slots. In block 203, the potential dedicated time slots are identified and stored for future reference, after which, the AC logic 116 progresses to block 225.

In block 225, the remaining time slots are examined to see if any hold any further HDLC flags that differ from those that existed in the potential dedicated time slots just saved. If such flags exist, then it is possible that they emanate from another frame relay switch or other device configured to communicate on different time slots at the central office 143 than those previously discovered. That is to say, different time slots in the TDM connection line may be dedicated for frame relay traffic to multiple frame relay channels, switches, or other devices. If, in block 225, there are further HDLC flags on the remaining non-dedicated time slots, then the AC logic 116 progresses to block 153 where the process is started over for this subsequent set of time slots. If there are no further HDLC flags, then the auto-configuration process is completed.

In some cases, the situation may occur where one or more frame relay devices communicating over the same TDM connection line using different dedicated time slots send the same HDLC flag. That is to say, that the flags sent by one or more of the frame relay devices are synchronized so that two or more frame relay devices appear to be a single device. If this occurs, the frame relay DSU 100 will attempt to establish the single LMI with multiple frame relay devices. This attempt will fail. However, the frame relay devices may attempt to communicate with the frame relay DSU 100, thereby shifting the HDLC flags they send. Consequently, individual LMI's can be established as discussed above.

This problem may also be addressed by attempting to establish an LMI with individual groupings of the time slots which transmit the same HDLC flag. Under this scheme, individual groupings are eliminated upon failure to establish the LMI. In any event, the present invention features a master timeout within which the frame relay DSU 100 is to establish the LMI with a frame relay device. If this timeout is tolled, then the system will cease its attempt to establish an LMI and revert to manual operation.

Note that the frame relay DSU 100 may communicate with other frame relay equipment and configurations at the central office other than that shown in FIG. 1. For example, the frame relay DSU 100 may communicate directly with a frame relay switch rather than communicating through the central office DSU 146. The frame relay DSU 100 May interface with frame relay equipment at the central office through a T1 multiplexor, a digital access and cross-connect, or through a central office POTS switch.

Also, the automatic configuration functionality of the present invention may occur at startup or on demand. Also, the automatic configuration is subject to an interrupt on demand so that the system may still be configured manually or if one wishes to address other functionality of the frame relay DSU 100. Also, the automatic configuration functionality may operate in a continuous mode in which the automatic configuration is executed each time the LMI goes down. In this continuous mode, the system need only to reconfigure the time slots used for frame relay traffic, and may assume the LMI type is as previously discovered so as to reduce the time necessary for system configuration, or the system may rediscover the LMI type as well. The option of reconfiguring the LMI type may be chosen by the end user.

Finally, note that the use of a degree of confidence variable is advantageous in that it takes much less time that the alternative method of performing an exhaustive search of all grouping permutations of the time slots to find those dedicated for frame relay traffic. Also, the use of the degree of confidence to determine potential dedicated time slots rather than trying to attempt to establish an LMI on a time slot grouping permutation provides another advantage in that the time it takes to sample and wait for a reasonable confidence level is much less than the time it would take to attempt to establish an LMI to determine if the time slots chosen are in fact dedicated for frame relay service.

Many variations and modifications may be made to the preferred embodiment of the invention without departing substantially from the spirit and principles of the invention. All such modifications and variations are intended to be included herein within the scope of the present invention, as defined by the following claims.

What is claimed is:

1. A system for automatic configuration of a frame relay network, comprising:
   logic for determining at least one dedicated time slot for frame relay service among a plurality of time slots on a TDM connection line; and
   logic for establishing a local management interface with a frame relay device connected to said TDM connection line, the establishment of said local management interface determining whether said at least one dedicated time slot is available for frame relay service.

2. The system of claim 1, wherein said logic for determining at least one dedicated time slot for frame relay service among a plurality of time slots on a TDM connection line further comprises:
   logic for sampling said plurality of time slots of said TDM connection line; and
   logic for detecting a data value on at least one of said time slots that corresponds to a high-level data link control flag transmitted by said frame relay device.

3. The system of claim 2, wherein said logic for determining at least one dedicated time slot for frame relay service among a plurality of time slots on a TDM connection line further comprises logic for setting a level of confidence variable correlating to a probability that said data value actually corresponds to a high-level data link control flag transmitted by said frame relay device.

4. The system of claim 3, wherein said logic for determining at least one dedicated time slot for frame relay service among a plurality of time slots on a TDM connection line further comprises logic for re-sampling said plurality of time slots on said TDM connection line.

5. The system of claim 4, wherein said logic for determining at least one dedicated time slot for frame relay service among a plurality of time slots on a TDM connection line further comprises:
   logic for increasing said level of confidence variable when said data value remains unchanged after said plurality of time slots are re-sampled; and
   logic for decreasing said level of confidence variable when said data value is different after said plurality of time slots are re-sampled.

6. The system of claim 5, wherein said logic for establishing a local management interface with a frame relay device connected to said TDM connection line further comprises logic for determining the type of local management interface required to communicate with said frame relay device via said at least one dedicated time slot.

7. The system of claim 1, further comprising:
   a processor; and
   a memory coupled to said processor, wherein said logic for determining at least one dedicated time slot for frame relay service and said logic for establishing a local management interface is stored on said memory in the form of software, said processor operating pursuant to both said logic for determining at least one dedicated time slot for frame relay service and logic for establishing a local management interface.

8. A system for automatic configuration of a frame relay network, comprising:

means for determining at least one dedicated time slot for frame relay service among a plurality of time slots on a TDM connection line; and means for establishing a local management interface with a frame relay device connected to said TDM connection line, the establishment of said local management interface determining whether said at least one dedicated time slot is available for frame relay service.

9. The system of claim 8, wherein said means for determining at least one dedicated time slot for frame relay service among a plurality of time slots on a TDM connection line further comprises:

means for sampling said plurality of time slots of said TDM connection line; and means for detecting a data value on at least one of said time slots that corresponds to a high-level data link control flag transmitted by said frame relay device.

10. The system of claim 9, wherein said means for determining at least one dedicated time slot for frame relay service among a plurality of time slots on a TDM connection line further comprises means for setting a level of confidence variable correlating to a probability that said data value actually corresponds to a high-level data link control flag transmitted by said frame relay device.

11. The system of claim 10, wherein said means for determining at least one dedicated time slot for frame relay service among a plurality of time slots on a TDM connection line further comprises means for re-sampling said plurality of time slots on said TDM connection line.

12. The system of claim 11, wherein said means for determining at least one dedicated time slot for frame relay service among a plurality of time slots on a time division multiplexed (TDM) connection line further comprises:

means for increasing said level of confidence variable when said data value remains unchanged after said plurality of time slots are re-sampled; and means for decreasing said level of confidence variable when said data value is different after said plurality of time slots are re-sampled.

13. The system of claim 12, further comprising means for determining a local management interface type to communicate with said frame relay device via said at least one dedicated time slot.

14. A method for automatic configuration of a frame relay network, comprising the steps of:

determining at least one dedicated time slot for frame relay service among a plurality of time slots on a time division multiplexed (TDM) connection line; and establishing a local management interface with a frame relay device connected to said TDM connection line, the establishment of said local management interface determining whether said at least one dedicated time slot is available for frame relay service.

15. The method of claim 14, wherein said step of determining at least one dedicated time slot for frame relay service among a plurality of time slots on a time division multiplexed (TDM) connection line further comprises the steps of:

sampling said plurality of time slots of said TDM connection line; and detecting a data value on at least one of said time slots that is identical to a high-level data link control flag transmitted by said frame relay device.

16. The method of claim 15, wherein said step of determining at least one dedicated time slot for frame relay service among a plurality of time slots on a time division multiplexed (TDM) line further comprises the step of setting a level of confidence variable correlating to a probability that said data value actually corresponds to a high-level data link control flag transmitted by said frame relay device.

17. The method of claim 16, wherein said step of determining at least one dedicated time slot for frame relay service among said plurality of time slots on said TDM connection line further comprises the step of re-sampling said plurality of time slots on said TDM connection line.

18. The method of claim 17, wherein said step of determining at least one dedicated time slot for frame relay service among said plurality of time slots on said TDM connection line further comprises the steps of:

increasing said level of confidence variable when said data value remains unchanged after said plurality of time slots are re-sampled; and decreasing said level of confidence variable when said data value is different after said plurality of time slots are re-sampled.

19. The method of claim 18, further comprising the step of determining the type of local management interface required to communicate with said frame relay device via said at least one dedicated time slot.

* * * * *